United States Patent [19]

Peeler et al.

[11] 3,958,624

[45] May 25, 1976

[54] HEAT TRANSFER FLUIDS

[75] Inventors: Robert L. Peeler, Albany; John M. King, San Rafael, both of Calif.

[73] Assignee: Chevron Research Company, San Francisco, Calif.

[22] Filed: July 2, 1973

[21] Appl. No.: 375,970

Related U.S. Application Data

[63] Continuation-in-part of Ser. No. 352,152, April 18, 1973, Pat. No. 3,920,572.

[52] U.S. Cl. ............................... 165/1; 208/48 AA; 252/75
[51] Int. Cl.² ............................................ C09K 5/00
[58] Field of Search ........................... 252/75, 33.4; 208/48 AA; 165/1

[56] References Cited
UNITED STATES PATENTS

| | | | |
|---|---|---|---|
| 2,616,911 | 11/1952 | Assef et al. | 252/33.4 |
| 2,695,273 | 11/1954 | Hook et al. | 252/33.4 |
| 3,211,652 | 10/1965 | Hinkamp | 252/75 |
| 3,554,914 | 1/1971 | Nagy | 252/75 |

OTHER PUBLICATIONS

Zuidema, H. H. The Performance of Lubricating Oils Reinhold Publishing Corp. (New York 1959), p. 1.

*Primary Examiner*—Benjamin R. Padgett
*Asistant Examiner*—Deborah L. Kyle
*Attorney, Agent, or Firm*—G. F. Magdeburger; C. J. Tonkin; L. L. Priest

[57] ABSTRACT

An improved anti-fouling additive for use in organic heat transfer fluids is disclosed. The additive comprises a combination of a barium overbased calcium sulfonate having a base ratio of at least 4 and a phenolic anti-oxidant.

6 Claims, No Drawings

HEAT TRANSFER FLUIDS

RELATED APPLICATION

This application is a continuation-in-part of U.S. application Ser. No. 352,152 filed Apr. 18, 1973, now U.S. Pat. No. 3920572.

BACKGROUND OF THE INVENTION

The use of heat transfer fluids is an essential part of many manufacturing operations. Typical operations include petroleum refining, chemical synthesis, asphaltic aggregate production, plywood lamination, plastic molding, etc. To permit operation at design capacity and to reduce heater hot spots, the heat transfer fluid should not cause serious fouling of the heat transfer surfaces.

Many organic heat transfer oils have been developed and have effected good heat transfer at elevated temperatures, typically 300° to 600°F. The most common and most economical of these organic oils is the petroleum hydrocarbon oil, although synthetic and chlorinated hydrocarbon oils are often used.

The use of an organic heat transfer oil in the high temperature applications has not been without problems. For example, during the operation of the exchanger, the organic medium comes into contact with the hot surfaces of the exchanger's tubes. At these high temperatures the organic medium partially decomposes to form small amounts of gums and carbonaceous materials. The decomposition products form deposits and films on the surfaces of the exchanger tubes causing a significant reduction in the heat transfer coefficient. Continued operation under these conditions over prolonged periods reduces the heat transfer efficiency to such an extent that disassembly of the exchanger for extensive cleaning is typically necessary.

Numerous attempts have been made to ameliorate exchanger fouling. It has been proposed, for example, to use more stable aromatic hydrocarbon oils or to alleviate the fouling problem by incorporating antioxidants, dispersants, etc., into the transfer medium. These solutions have met with only limited success and have in some instances substantially increased the cost of the transfer medium.

In one method disclosed in U.S. Pat. No. 3,554,914, it is suggested that a calcium sulfonate be incorporated into the heat transfer oil. It was found that the presence of a calcium sulfonate having a base number between about 15 and 30 mg.KOH/g significantly reduced the heat exchange fouling.

Even though the use of the suggested calcium sulfonate reduces the degradation of the transfer medium, heat exchanger fouling still remains a burdensome problem. A need therefore exists for an additive which substantially reduces heat exchanger fouling that is easy to prepare and that is relatively inexpensive.

SUMMARY OF THE INVENTION

We have found that heat exhanger fouling from an organic heat transfer medium can be substantially reduced by incorporating into the medium a combination of an oil-soluble barium overbased calcium sulfonate having a base ratio of at least 4 and an oil-soluble phenolic anti-oxidant.

Those barium overbased calcium sulfonates having a base ratio below 4.0 and particularly below 3.5 must be used at too high a concentration in order to sufficiently suppress exchanger fouling and, therefore, are not considered within the scope of this invention.

DETAILED DESCRIPTION OF THE INVENTION

The fouling tendencies of an organic heat transfer medium can be significantly reduced by incorporating into the medium a combination of 0.05 to 2.0 wt. percent of a phenolic anti-oxidant and from 0.05 to 5 and preferably from 0.1 to 2 weight percent of an barium overbased calcium aromatic sulfonate having a base ratio in excess of 4.0 and preferably between about 4.5 and 11 and more preferably from 5.1 to 10. The sulfonate portion should have a molecular weight between about 300 and 650 and preferably between about 500 and 550. Overbased materials are characterized by a metal content in excess of that stoichiometrically required by the reaction of the metal with the particular sulfonic acid. The base ratio is the ratio of the chemical equivalents of excess metal in the product to the chemical equivalents of the metal required to neutralize the sulfonic acid.

BARIUM OVERBASED CALCIUM SULFONATE

The neutral calcium sulfonates which may be overbased to form the compounds useful in the practice of this invention can comprise any oil-soluble calcium aromatic sulfonate. Preferably, these sulfonates have the following generalized chemical formula:

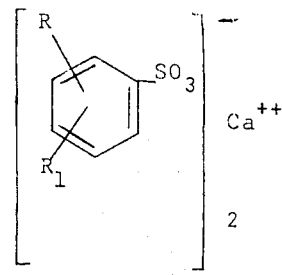

wherein:

R is hydrogen or an alkyl having from 10 to 22 carbons (preferably from 15 to 21) and preferably attached to the benzene ring through a secondary carbon atom; and $R_1$ is an alkyl having from 3 to 10 carbons when R is an alkyl and having from 8 to 22 carbons when R is hydrogen.

In a preferred embodiment the neutral calcium sulfonate is a dialkylbenzene sulfonate of the above formula wherein R is a straight chain aliphatic hydrocarbon radical of 17 to 21 carbon atoms, usually having at least 2 homologs present, and having secondary carbon attachment to the benzene ring and $R_1$ is a branched chain alkyl group of 3 to 10 carbon atoms, more usually from 4 to 9 carbon atoms, having at least 1 homolog present, and preferably having at least two homologs present, and there being at least 1 branch of 1 to 2 carbon atoms, more usually of 1 carbon atom, i.e., methyl, per 2 carbon atoms along the longest chain. The attachment of the shorter alkyl group will generally be secondary or tertiary. Particularly preferred compositions have $R_1$ with an average of 5 to 8 carbon atoms.

Usually, the difference in average number of carbon atoms between the short and long chain alkyl groups will be at least 10 and more usually at least 12, and not more than 16.

The preferred dialkylbenzene sulfonates which find use in the practice of this invention will generally have small amounts of monalkylbenzene sulfonate, wherein the alkyl group is of from 17 to 21 carbon atoms present within the admixture. Preferably, the amount of the monoalkylbenzene sulfonate will not exceed 30% and more preferably the monoalkylbenzene sulfonate will not exceed 20% by weight of the total sulfonate. Generally, it will be in the range of about 5 to 20 weight percent.

The positions of the alkyl group and the sulfonate on the benzene ring in relation to each other are not critical to this invention. Generally, most of the isomeric possibilities will be encountered — with the particular isomers having the least steric hindrance being predominant. Also, there will be a broad spectrum of isomers based on the carbon of the alkyl group bonded to the benzene ring, depending on the method of preparation and the ractants used in the preparation.

Illustrative short chain alkyl groups are isopropyl, tert.-butyl, neopentyl, diisobutyl, dipropenyl, tripropenyl, etc.

Illustrative of the long chain alkyl groups are heptadecyl, octadecyl, nonadecyl, eicosyl and heneicosyl.

Illustrative individual compositions are calcium isopropyleicosylbenzene sulfonate, calcium tert.-butylnonadecylbenzene sulfonate, calcium dipropenyloctadecylbenzene, calcium diisobutyloctadecylbenzene sulfonate, calcium (Propylene trimer) nonadecylbenzene sulfonate, etc.

The total number of carbon atoms in the alkyl groups will generally be in the range of at least about 20 and less than about 28. While small amounts of the dialkylbenzenes may be outside this range, the average number of carbon atoms of the alkyl groups over the total composition will be within the range.

In a preferred embodiment, a monoalkyl polypropyl benzene fraction having a boiling point range of about 318°–478°F. (ASTM D 447) containing from 4 to 9 carbon atoms (an average of 6 carbon atoms) and an average molecular weight of about 167 is alkylated with a substantially straight chain $C_{17}$–$C_{21}$ cracked wax α-olefin. The molecular weight of the dialkylbenzene mixture has an average value in the range of 400–410.

The average molecular weights of the dialkylbenzenes used to prepare the sulfonate will generally be in the range of about 350 to 460, more usually in the range of about 375 to 425.

The monoalkyl benzenes can be prepared by simply reacting benzene with a mono-olefin in a simple alkylation process. Typical alkylation catalysts include Friedel-Crafts catalysts such as hydrogen fluoride, aluminum chloride, phosphoric acid, etc. The alkylation temperatures will ordinarily be in the range of about 40° to 100°F.

The preferred dialkyl benzenes can be prepared is substantially the same manner. A description of its preparation is disclosed in U.S. Pat. No. 3,470,097.

The dialkylbenzenes may then be readily sulfonated, using conventional sulfonation procedures and agents, including oleum, chlorosulfonic acid, sulfur trioxide (complexed or thin film dilution techniques) and the like.

Various methods may be used to neutralize the sulfonic acid obtained, these methods being extensively described in the art. See for example U.S. Pat. Nos. 2,485,861, 2,402,325 and 2,732,344.

The neutralization step is conveniently conducted by contacting the sulfonated alkyl or dialkyl benzenes with an aqueous sodium hydroxide solution. The product is a neutral sodium sulfonate. The neutral calcium sulfonate is prepared by a simple metal exchange process. The sodium sulfonate is contacted with a calcium salt, typically the halide salt, and the mixture heated. The exchange process is accomplished at temperatures of 50° to 150°C and contact times of 0.5 to 10 hours, usually from 1 to 3 hours.

Ordinarily, the neutralized product will be mildly overbased, having from about 0.02 to 0.7 mol percent excess of basic calcium over that required for neutralizing the acid values. Alkalinity values of these neutral compositions will generally be in the range of about 1 to 30, more usually from about 1 to 10 mg. KOH/g.

Specific examples of exemplary calcium metal sulfonates which may be employed in the practice of this invention or overbased to form the active component of this invention are disclosed in U.S. Pat. Nos. 3,691,075, 3,629,109, 3,595,790, and 3,537,996. These patents are herein incorporated by reference.

OVERBASING OF THE CALCIUM SULFONATE

Various methods of overbasing calcium sulfonates to form superbased compositions have been reported in the literature. See for example U.S. Pat. Nos. 2,695,910, 3,282,835 and 3,155,616, as well as Canadian Pat. No. 570,814. The preferred method employs a method similar to that described in U.S. Pat. No. 3,155,616.

The overbasing process can be conveniently conducted by charging to a suitable reaction zone the neutral calcium sulfonate, an inert hydrocarbon solvent, an alkanol and a barium base (usually barium oxide or hydroxide). The mixture is agitated and maintained at a temperature and pressure sufficient to hold the alkanol within the liquid mixture. Carbon dioxide is then contacted with the reaction medium, preferably sparged or bubbled through the liquid mixture. The introduction of carbon dioxide is continued until its absorption rate into the mixture ceases or substantially subsides. Generally, from 0.2 to 1.6 mols and more usually from 0.9 to 1.3 mol of carbon dioxide will be absorbed by the mixture for every mol of barium base present.

The crude reaction product is then heated to strip out the alkanol and any water of reaction. The stripping will generally be conducted at temperatures below 150°C and usually below 125°C.

After the alkanol and water stripping, if any, has been terminated, the product may be filtered. In a preferred embodiment, the hydrocarbon diluent is first stripped and then the product is filtered. Also, further addition of oil may be made to obtain a product having a somewhat lower alkalinity value and viscosity. The choice of the particular route will depend on the equipment, the materials used; their physical properties, and the product desired.

The stripping of the hydrocarbon diluent will generally be carried out at temperatures below 200°C and will usually not exceed 175°C, depending on the hydrocarbon diluents used. Preferably, when xylene is used, the temperature will not exceed 150°C.

Occasionally, the final product will be filtered again to remove any adventitious particulate matter which may still be present.

The alkanol used, preferably methanol, will generally have from about 0.1 to 1 weight percent water, more usually from about 0.3 to 0.7% water. The alkanol will generally be present in from about 2 to 20, more usually from about 3 to 10 mol ratio to barium base. Usually, the total water present in the alkanol should be about 0 to 15 mol percent based on the barium base and more usually 5 to 10 mol percent.

The hydrocarbon diluent will be one having a boiling point higher than alkanol to permit its retention when the alcohol is removed during processing. The boiling point should generally be less than about 180°C and preferably less than about 150°C. Usually, the hydrocarbon diluent will form an azeotrope with water. The usual diluents contain aromatic hydrocarbons of from 7 to 10 carbon atoms, having boiling points in the range of about 100° to 180°C. These include toluene, xylene, cumene and cymene. The hydrocarbonaceous diluent is present in an amount to form about a 5 to 20 weight percent dispersion of alkaline earth metal base in the initial composition, usually an 8 to 15 weight percent dispersion.

The amount of the sulfonate charged is based on the barium base charged: from about 6 to 50 equivalents of barium base will be used per equivalent of organic sulfonate, more usually from about 8 to 35 equivalents of barium base per equivalent of organic sulfonate. Thus, alkalinity values can be achieved of 100 to 400 mg.KOH/g, preferably from about 150 to 380 mg.KOH/g.

PHENOLIC ANTI-OXIDANTS

The second component of the combination of this invention is a phenolic anti-oxidant. Included within this definition are sterically hindered phenolics such as hindered phenols and bisphenols, hindered 4,4'-thio-bis-phenols, hindered 4-hydroxy and 4-thiol-benzoic acid esters and dithio esters, hindered bis(4-hydroxy- and 4-thiol-benzoic acid and dithio acid) alkylene esters; alkaline earth metal aminophenates and sulfurized alkaline earth metal phenates. The sterically hindered phenols and benzoic acid esters are the preferred antioxidants.

The sterically hindered phenolics have the basic groups

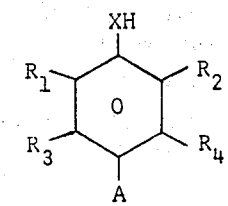

wherein:

X is sulfur or oxygen and preferably oxygen;

$R_1$ and $R_2$ are alkyl groups which sterically hinder the XH group and preferably have from 4 to 10 carbons and usually branched chain;

$R_3$ and $R_4$ are the same or different constituent selected from hydrogen or a $C_1$–$C_4$ alkyl and preferably hydrogen; and A is defined infra.

The phenolic moiety is substituted in both positions ortho to the hydroxy or thiol groups with alkyl groups which sterically hinder these groups. Such alkyl substituents usually have 3 to 10 carbons and one generally branched rather than straight chain, e.g., t-butyl, t-amyl, and the like.

The first group of hindered phenolic antioxidants is the single hindered phenols — i.e., where A in the above formula is hydrogen or an alkyl group. Examples of such compounds include 2,6-di-tert-butylphenol, 2,6-di-tert-butyl-p-cresol, 2,6-di-tert-amyl-p-cresol; 2-tert-butyl-6-tert-amyl-p-cresol, etc. Trialkylated monohydroxy phenols which may be employed herein are disclosed in U.S. Pat. No. 2,265,582.

A second group of hindered phenolic anti-oxidants is the hindered bis-phenols. In this case, A is a bond to another basic phenolic group preferably through an intervening alkylene group. Examples of these compounds include 4,4'-methylene bis(2,6-di-tert-butyl phenol), 4,4'-dimethylene bis (2,6-di-tert-butyl phenol), 4,4'-tremethylene bis (2,6-di-tert-amyl phenol), 4,4'-trimethylene bis (2,6-di-tert-butyl phenol), etc.

Another group of hindered phenolic anti-oxidants is the hindered 4,4'-thio bis-phenols, i.e., where A in the formula is sulfur connected to another phenolic group. Examples of these compounds include 4,4'-thio bis(2,6-di-tert-butyl phenol), 4,4'-thio bis(2,6-di-sec-butyl phenol), 4,4'-thio bis(2-tert-butyl-6-isopropyl phenol), etc. These compounds and their preparations are described in detail in U.S. Pat. No. 3,326,800 which is herein incorporated by reference.

A fourth group of hindered phenolic anti-oxidants are 4-hydroxy and 4-thiol-benzoic dithio acid esters, i.e., A in the above formula is a $C_2$–$C_{21}$ ester or a dithio ester group. Exemplary compounds of this group include 2,6-di-T-butyl-4-hydroxy benzoic acid methyl ester, 2,6-di-t-butyl-4-hydroxy dithiobenzoic acid methyl ester, 2,6-di-t-butyl-4-hydroxy benzoic acid n-octyl ester, 2,6-di-t-butyl-4-hydroxyl dithiobenzoic acid n-octyl ester, 2,6-di-t-butyl-4-thiol dithiobenzoic acid, n-octyl ester, 2,6-di-t-butyl-4-hydroxy dithiobenzoic acid hydroxypropylene oxypropylene ester, etc.

Another group of hindered phenolic anti-oxidants are bis(4-hydroxy- or 4-thiol-benzoic acid or dithiobenzoic acid) alkylene esters, i.e., A in the above formula is a $C_2$–$C_{21}$ diester or dithio ester connected through an alkylene linkage to another phenolic group. Exemplary compounds of this type include bis (3,5-di-t-butyl-4-hydroxy dithiobenzoic acid) methylene ester, bis(3,5-di-t-butyl-4-hydroxydithiobenzoic acid) ethylene ester, etc. The preparation of these compounds is the same as set forth above, except that the monohalo hydrocarbon is replaced with a dihalohydrocarbon.

The nonhindered phenolics which may be employed in the practice of this invention are the alkaline earth metal aminophenates and sulfurized alkaline earth metal phenates. The oil-soluble alkaline earth metal aminophenates can be prepared by reacting a Mannich base with an alkaline earth metal hydroxide or oxide. These compounds are broadly described by the following generalized structural formula:

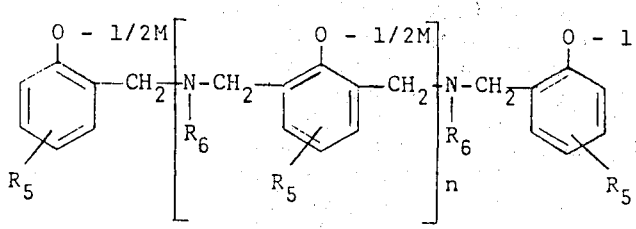
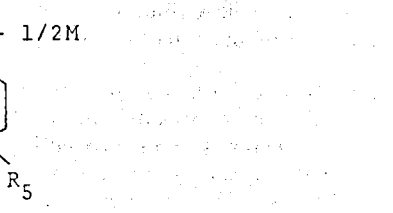

wherein

M is an alkaline earth metal;

$R_5$ is a straight-chain or branched chain saturated hydrocarbon radical having from 8 to 35 carbons;

$R_6$ is a lower alkyl having from 1 to 5 carbons; and n is an integer generally varying from 0 to 25 and preferably at least 50 percent of the molecules having n varying from 3 to 25.

The molecular weight of the above composition varies over a wide range, but, in a preferred embodiment, 50 percent of the molecules have a molecular weight above about 1,500. The metal aminophenates described in U.S. Pat. Nos. 2,725,357, 3,454,497, 2,353,491, 3,649,229, and 3,442,808 are exemplary of the types which may be employed in this invention.

Another class of non-hindered phenolic anti-oxidants is the sulfurized metal phenates. These compounds are prepared by reacting an alkyl phenol with sulfur and an alkaline earth metal base in the presence of a mutual solvent such as ethylene glycol. These compounds have the general structure:

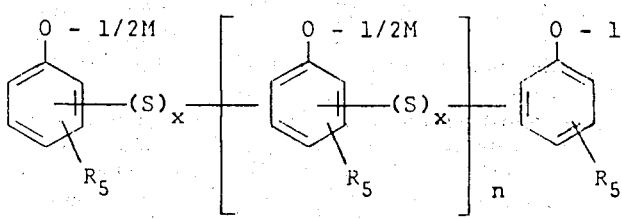

wherein

M, R and n are defined supra, and x is an integer from 1 to 5.

The preparation of these compounds is disclosed in U.S. Pat. No. 3,367,867.

In a preferred embodiment, the calculated sulfur to metal atom ratio is between about 1 and 4.

The above-sulfurized metal phenates may also be carbonated to improve the oil solubility of the compounds. Sulfurized and carbonated metal phenates are disclosed in U.S. Pat. Nos. 3,388,063, 2,680,097, 2,916,454, 2,989,466, 3,718,589 and 3,178,368.

In addition, combinations of sulfurized and/or carbonated metal phenates and alkaline earth metal amino phenates may be employed. These combinations may be physical combinations or chemical combinations. Exemplary compounds of this type are disclosed in U.S. Pat. Nos. 3,586,629 and 3,658,496. A particularly preferred combination is the reaction of a sulfurized polyalkylphenol with a Mannich base. Those compounds are described in a copending application Ser. No. 186,494, now U.S. Pat. No. 3,741,896.

ORGANIC HEAT TRANSFER MEDIUM

The organic heat transfer medium can comprise any stable inert organic liquid. In a preferred embodiment, the heat transfer fluid has an initial boiling point above about 400°F, preferably above about 500°F and more preferably above about 600°F. A typical boiling range is from 700° to 900°F.

The preferred and most widely used organic medium is hydrocarbon oils and preferably those containing a high aromatic content. A discussion of various hydrocarbon oils is disclosed in U.S. Pat. No. 3,554,914 and includes heat transfer oils such as refined mineral oils, pale oils, bright stocks, refined aromatic oils, bottoms from detergent alkylate, dimer alkylate bottoms, etc.

Particularly preferred hydrocarbon oils include neutral oils having a viscosity from 100 to 500 SUS at 100°F and preferably from 150 to 250 SUS at 100°F.

Exemplary commercial heat transfer oils include Chevron Heat Transfer Oils marketed by Chevron Oil Company, Mobiltherm 600, marketed by Mobil Oil Company, and Humbletherm 500 and Humbletherm N-500, marketed by EXXON Oil Company.

Other types of organic heat transfer oils include oils derived from coal products and synthetic oils, e.g., alkylene polymers (such as polypropylene, butylene, etc., and mixtures thereof), alkylene oxide polymers (such as polymers prepared by polymerizing alkylene oxide (ethylene oxide, propylene oxide) in the presence of water or alcohol, e.g., ethyl alcohol), carboxylic acid esters, alkylbenzenes, polyphenyls (e.g., biphenyls and terphenyls) hydrogenated terphenyls, polychlorinated biphenyls, alkyl diphenyl ethers, etc.

An additive concentrate of the barium overbased calcium sulfonate and the phenolic antioxidant may be made for subsequent addition to the heat transfer oil. In this embodiment an oil solution containing from 10 to 50 weight percent of the barium sulfonate is prepared and from 0.5 to 20 weight percent of an phenolic antioxidant is added. The oil solution is preferably a mineral oil solution, however, any of the organic heat transfer oils may be employed.

EXAMPLE 1

This example is presented to illustrate the preparation of a preferred dialkyl benzene sulfonate which is used to prepare the overbased metal sulfonates of this invention.

Benzene is alkylated using a tetramer polypropylene fraction and HF alkylation catalyst, a reaction temperature of about 65°F, and efficient mixing. The hydrocarbon phase is separated, washed and fractionated. The lower alkyl fraction (boilingg point range 318° to 478°F, ASTM D 447 distillation) is collected as feed for the second stage alkylation with a mixture of straight chain 1-olefins. The average molecular weight of the above branched chain alkylbenzene is 164. This corresponds to an average of 6 carbon atoms per alkyl group in the mixture. The over-all alkyl carbon atom content corresponding to the above boiling point range is the $C_4$–$C_9$ range.

Using the above branched chain monoalkylbenzene and a substantially straight chain $C_{17}$–$C_{21}$ 1-alkene fraction obtained from cracked wax, and hydrogen fluoride catalyst, the desired dialkylbenzene is produced in a stirred, continuous reactor. The 1-alkene feed has the following characteristics:

| | |
|---|---|
| Average mol weight | 268 |
| Average number of carbon atoms per alkyl group | 19 |
| Olefin distribution, weight percent: | |
| $C_{17}$ | 2 |
| $C_{18}$ | 22 |
| $C_{19}$ | 39 |
| $C_{20}$ | 32 |
| $C_{21}$ | 5 |
| Reaction conditions: | |
| LHSV | 2 |
| Temperature, °F | 100 |
| Monoalkylbenzene to α-olefin, mol ratio | 2–1 |
| Hydrocarbon to HF ratio, volume | 2.3–1 |

After reaction the settled product is separated into an organic phase and a lower HF acid phase. The crude dialkylbenzene organic phase is washed and then fractionated by distillation. A minor amount of forecut, mainly monoalkylbenzene, is collected up to an overhead temperature of about 450°F at 10 mm.Hg. The balance of the distillate is the desired product, and has an average molecular weight of about 405. The difference between the average carbon atom content of the alkylchain types is about 13.

The dialkylbenzene prepared as in Example 1 is charged to a stirred reaction vessel fitted for temperature control along with 130 neutral oil which is substantially free of sulfonatable material. The volume ratio of the two materials is 3½ to 4, respectively, and to this mixture is added, over a period of several hours, 2 volumes of 25% oleum. The reaction temperature is maintained at about 100°F. Two phases developed in the settled mixture, the lower being a spent mineral acid phase and the upper being the desired sulfonic acid phase.

The separated sulfonic acid-oil mixture is then neutralized with one volume of 50% aqueous caustic diluted with 15 volumes of aqueous 2-butanol. During the neutralization the temperature is maintained below about 110°F, and after completion thereof the neutral solution is heated and maintained at 140°F during a second phase separation. Two phases developed, a lower brine-alcohol solution and an upper neutral alcohol-sodium sulfonate solution.

EXAMPLE 2

The preparation of a neutral calcium sulfonate is illustrated in this example. A 3-liter glass flask is charged with 80 grams of calcium chloride and 800 milliliters of water. Thereafter, 1,500 grams of the sodium sulfonate as prepared by the method of Example 1 is charged to the flask. The contents are heated to 85°F under agitation and maintained at these conditions for 1 hour. After 1 hour, the contents are allowed to phase separate and the water layer drawn off. 800 milliliters of distilled water is admixed with the sulfonate and heated for one hour. The phases are allowed to separate and the aqueous phase drawn off. The sulfonate is washed three additional times with water and one time with an aqueous isobutyl alcohol solution. The mixture is heated to 112°C to remove any residual water and isobutyl alcohol. 500 milliliters of toluene is added to the sulfonate and the admixture filtered through a Celite 512 filter. The product is stripped at 185°C under 3 mm.Hg vacuum to yield 740 grams of neutral calcium sulfonate. Analysis of the product reveals

| | |
|---|---|
| Wt % sulfated ash | 6.09 |
| Wt % metal | 1.93 calcium |
| Base No. | 0 |

EXAMPLE 3

The preparation of a neutral barium sulfonate is illustrated by the example. A 3-liter, 3-neck round-bottomed flask is charged with 170 grams of barium chloride ($BaCl_2 \cdot 2H_2O$) in 800 milliliters of water and 1,500 grams of the sodium sulfonate prepared by the method of Example 1. The contents are stirred and heated to 85°C for 1 hour. The product is then phase separated and washed four times in the same manner as described in Example 2. The yield is 665 grams of barium sulfonate. An analysis of the product reveals

| | |
|---|---|
| Wt % sulfated ash | 9.84 |
| Wt % metal | 4.7 |
| Base No. | 0 |

EXAMPLE 4

This example is presented to illustrate an exemplary overbasing procedure in preparing an exemplary overbased calcium sulfonate. A 1-liter glass 3-necked flask is charged with 18.9 grams of calcium hydroxide, 20 milliliters of methanol, 250 milliliters of a petroleum aliphatic thinner (6% aromatic hydrocarbons, 250°F initial BP and 310°F end BP), and 100 grams of a calcium sulfonate prepared by the method of Example 1 except containing 1.64 weight percent calcium. An additional 250 milliliters of the thinner is then added and the contents stirred. Carbon dioxide is bubbled through the mixture at room temperature and stopped when the uptake rate leveled off. A total of 14 grams of $CO_2$ is taken up by the mixture. The product is heated to 130°C to remove methanol and water and thereafter the product is filtered through a Celite 512 filter. The thinner is stripped by heating to 180°C at two mm.Hg vacuum. The yield of overbased metal sulfonate is 101 grams. The basic calcium content of the product is 7.71 wt % with a base ratio of 5.8. The Base Number is measured to be 216 mg.KOH/g.

EXAMPLE 5

This example is presented to illustrate an exemplary overbasing procedure in preparing an overbased barium sulfonate. A two-liter glass flask is charged with 50 grams of barium sulfonate is prepared by the method of Example 3, 500 milliliters of xylene, and 72 milliliters of methanol. Thereafter, 36.2 grams of barium oxide is added to the mixture in three separate drops — each 10 minutes apart. Carbon dioxide is bubbled into the reaction mixture until a total of 12 grams are taken up. Methanol and water are removed by distillation and the product filtered through a Celite 512 filter. The xylene is stripped from the system by heating to 180°C under a 2 mm.Hg. vacuum. The product has a barium base ratio of 4.7 and a base number of 160 mg.KOH/g.

EXAMPLE 6

This example is presented to illustrate the superior low fouling heat transfer fluids containing an overbased metal sulfonate. In this example, a series of heat transfer tests performed which measure the fouling properties of oils containing varying amounts and varying kinds of metal sulfonates.

The salt bath and travels upward through the small diameter middle section to the upper section where it is cooled. Since the upper section is open to the atmosphere, the oil is in contact with air in this section.

The results from the various sample oils tested herein is displayed in the following Table I.

TABLE I

Heat Transfer Fouling Test

| Test | Type | Metal Sulfonate Additive Base Ratio[1] | Conc[2] | Test Temp. (°F) | Test Time (hrs) | Fouling Deposit Amount |
|---|---|---|---|---|---|---|
| 1 | None | — | — | 600 | 240 | HEAVY |
| 2 | Neutral Calcium Sulfonate | 0 | 7 | 600 | 240 | HEAVY |
| 3 | Overbased Calcium Sulfonate | 10.2 | 14 | 600 | 504 | NONE |
| 4 | '' | 5.7 | 14 | 600 | 504 | NONE |
| 5 | '' | 5.7 | 21 | 600 | 504 | NONE |
| 6 | '' | 5.7 | 7 | 600 | 504 | NONE |
| 7 | '' | 5.8 | 14 | 600 | 504 | NONE |
| 8 | '' | 5.8 | 29 | 600 | 504 | NONE |
| 9 | '' | 7.8 | 29 | 650 | 336 | TRACE |
| 10 | '' | 10.2 | 29 | 650 | 336 | TRACE |
| 11 | '' | 10.2 | 48 | 650 | 336 | TRACE |
| 12 | Neutral Barium Sulfonate | 0 | 14 | 600 | 240 | HEAVY |
| 13 | Overbased Barium Sulfonate | 0.6 | 7 | 600 | 240 | MEDIUM |
| 14 | '' | 4.7 | 7 | 600 | 504 | NONE |
| 15 | '' | 4.7 | 14 | 600 | 504 | NONE |
| 16 | '' | 7.3 | 14 | 600 | 504 | TRACE |
| 17 | '' | 5.0 | 7 | 600 | 504 | NONE |
| 18 | '' | 5.0 | 14 | 600 | 504 | NONE |
| 19 | '' | 4.5 | 7 | 600 | 504 | TRACE |
| 20 | Overbased Calcium Sulfonate | 3.85 | 21 | 650 | 336 | HEAVY |
| 21 | '' | 5.8 | 15 | 650 | 326 | HEAVY |
| 22 | Overbased Barium Sulfonate | 10.4 | 14 | 600 | 504 | LIGHT MEDIUM |

[1] As defined on page 3
[2] Concentration of metal sulfonate in oil as expressed in mM./kg In the test, the sample oil is placed in the test apparatus and heated to a temperature of 600° to 650°F for a period of 240 to 504 hours. At the end of the test, the oil is visually observed for deposit content. The heavier the deposit, the greater the fouling tendencies of the heat transfer oil. The rating is:

HEAVY — representing an opaque deposit
MEDIUM — representing a brown translucent deposit
LIGHT — representing a lacquer or slight staining of the test apparatus walls
TRACE — representing trace amounts of deposits with only partial coverage of the surface
NONE — representing no visual deposits.

The sample oils are prepared by incorporating varying amounts of a neutral or overbased metal sulfonate into a solvent refined Mid-continent 200 neutral oil. The neutral sulfonates are substantially prepared by the method of Examples 2 and 3. The overbased sulfonates are substantially prepared by the method of Examples 4 and 5.

The test apparatus comprises an elongated glass tube of 450 mm total length having (1) an upper tubular section open at its top, 100 mm in length, with a 16 mm tubing OD, (2) a middle section, 250 mm in length, with a 6 mm tubing OD and a lower section 100 mm in length with a 16 mm tubing OD and closed at its bottom end. The lower section is immersed in a salt bath which is maintained at a constant temperature of 600° or 650°F. The upper section is equipped with a cooling jacket so that water may be circulated through the jacket to cool the sample oil within the tube. The sample oil is placed within the tube so that the oil in the lower section is heated to elevated temperatures from The above table illustrates the practice of the instant invention in reducing fouling of a heat transfer oil. Test 1 illustrates the heavy deposits associated with the test oil without the presence of an antifouling additive. Tests 2 and 12 illustrate the relatively little effect of neutral calcium and barium sulfonates on the fouling properties both exhibiting heavy deposits. Tests 3–11 and 14–19 illustrate the substantial reduction of deposit formation by using an overbased calcium or barium sulfonate having a base ratio above 4. Tests 2, 12, 13 and 20 illustrate the problems of using neutral or overbased metal sulfonates having a base ratio below 4. Tests 21 and 22 are presented to illustrate that variations in the data occur with this test apparatus. Thus, the data as a whole must be viewed in order to observe the effect of the various additives.

EXAMPLE 7

This example is presented to illustrate the preparation and effect of mixed overbased metal sulfonates. A 2-liter 3-neck round-bottomed glass flask is charged with 100 grams of a neutral calcium sulfonate, prepared by the method of Example 2, 500 ml of xylene and 160 ml of methanol. While stirring the mixture, barium oxide is added in three separate drops, each being 10 minutes apart. Carbon dioxide is bubbled through the mixture until 18 grams have been absorbed. The reaction medium is heated to 135°C to distill out the methanol and water filtered through a Celite 512 filter and stripped of xylene by heating to 180°C under a 2 mm. Hg. vacuum. The overbased barium/calcium sulfonate has a base ratio of 5.1 and contains 1.14 wt % calcium and 19.8 wt % barium. The product had a base number of 162 mg.KOH/g.

The above overbased barium/calcium sulfonate is tested in accordance with the procedure set forth in Example 6 and found to have the following effect on the heating oil:
Base Ratio — 5.1
Concentration — 0.51 mM./kg.
Temperature — 600°F
Time — 504 hours
Deposit Rating — None

EXAMPLE 8

This example is presented to illustrate the effectiveness of the combination of various barium overbased calcium sulfonates and a representative phenolic antioxidant in improving the oxidation stability of a heat transfer oil. This combination is compared to other combinations to illustrate the novelty of the claimed invention.

In each of the tests, various amounts of an overbased metal sulfonate are added to a 200 neutral lubricating oil along with varying amounts of a hindered phenolic anti-oxidant 4,4'-methylene-bis (2,6-di-tert-butyl-phenol) marketed by Ethyl Corporation under the brand name Ethyl 702. This solution is then subjected to an oxidation test. The test is conducted in a glass cell consisting of a 100 ml sample compartment, a stirring mechanism and a compartment holding solid sodium or potassium hydroxide pellets which serve as a drying agent. The pellets have only vapor phase contact with the liquid in the sample compartment. The cell is only open to a 1.5-liter bell jar filled with 99.85% oxygen kept at atmospheric pressure. In each test a 25-gram sample of the compounded oil and 20 ppm of iron as iron naphthenate are charged to the sample compartment of the cell. The oil within the sample compartment is heated to a temperature of 340°F and maintained at that temperature under agitation. The time required for an equivalent 100 grams of the test sample to remove 1,000 ml of oxygen is observed and reported in the following Table II.

TABLE II

OXIDATION TESTS

| Test | Overbased Metal Sulfonate Type | Base Ratio | Conc.mM/kg | Phenolic Anti-oxidant Conc. (wt %) | Oxidation Life (hr) |
|---|---|---|---|---|---|
| 1 | none | — | — | none | 0.42 |
| 2 | none | — | — | 0.3 | 1.67 |
| 3 | Ca overbased Ca | 5.8 | 29 | 0.3 | 0.98 |
| 4 | Ca overbased Ca | 10.2 | 29 | 0.3 | 1.26 |
| 5 | Ba overbased Ba | 5.0 | 22 | 0.3 | 2.36 |
| 6 | Ba overbased Ca | 5.1 | 29 | 0.3 | 2.88 |
| 7 | Ba overbased Ca | 5.1 | 67 | 0.3 | 3.42 |
| 8 | Ba overbased Ca | 2.2 | 67 | 0.3 | 4.6* |
| 9 | Ba overbased Ca | 5.3 | 27 | 0.3 | 3.0 |
| 10 | Ba overbased Ca | 5.3 | 67 | 0.3 | 3.63 |
| 11 | Ba overbased Ca | 5.5 | 29 | 0.3 | 3.45 |

*Commerical sulfonate mixture may contain additional anti-oxidants

The above table illustrates a substantial improvement of the combination of a barium overbased calcium sulfonate (Tests 6–11) over the calcium overbased calcium sulfonates (Tests 3–4) and over the barium overbased barium sulfonate (test 5). The phenolic antioxidant alone exhibited an oxidation life of 1.67, but when combined with a barium overbased calcium sulfonate such as Test 10, the combination exhibited a more than two-fold increase in oxidation life.

We claim:

1. An additive concentrate composition suitable for use in a heat transfer oil comprising a hydrocarbon oil solution containing (A) 10–50 weight percent of an oil soluble barium overbased calcium sulfonate of the formula

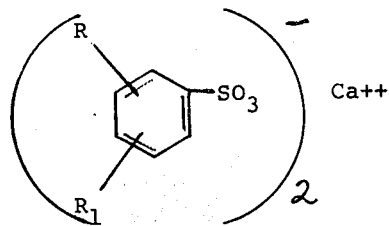

wherein
R is hydrogen or an alkyl having from 10 to 22 carbons, and
R$_1$ is an alkyl having from 3 to 10 carbons when R is alkyl and having from 8 to 22 carbon when R is hydrogen and having a base ratio of at least 4 and (B) 0.5 to 20 weight percent of 4,4'-methylene bis(2,6-di-tert-butyl phenol).

2. The composition defined in claim 1 wherein said base ratio is between 5.1 and 10.

3. A heat transfer oil composition which comprises (1) a hydrocarbon oil, (2) from 0.05 to 5 weight percent of an oil-soluble barium overbased calcium sulfonate of the formula

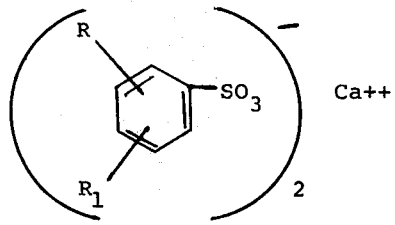

wherein
R is hydrogen or an alkyl having from 10 to 22 carbons, and
R$_1$ is an alkyl having from 3 to 10 carbons when R is alkyl and having from 8 to 22 carbons when R is hydrogen; and having a base ratio of at least 4 and (3) from 0.5 to 2 weight percent of 4,4'-methylene bis(2,6-di-tert-butylphenol).

4. A heat transfer oil composition comprising a major portion of a hydrocarbon oil having a viscosity from 100 to 400 SUS at 100°F, from 0.1 to 2 weight percent of an oil soluble barium overbased calcium aromatic sulfonate of the formula

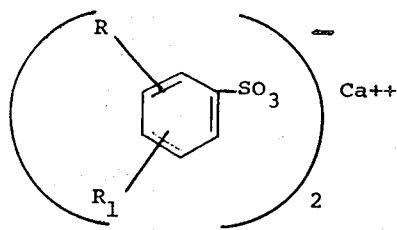

wherein
R is hydrogen or an alkyl having from 10 to 22 carbons, and
$R_1$ is an alkyl having from 3 to 10 carbons when R is alkyl and having from 8 to 22 carbons when R is hydrogen; and having a base ratio between 5.1 and 10 and from 0.05 to 2 weight percent of 4,4'-methylene bis(2,6-di-tert-butylphenol).

5. In a method of exchanging heat wherein a hydrocarbon oil heat transfer fluid boiling within the range of about 400° to 900°F is passed through one side of a heat exchanger and a process stream is passed through the other side to effect an exchange of heat between said heat transfer fluid and said process stream, an improvement for reducing the fouling properties of said heat transfer fluid comprising incorporating into said heat transfer fluid (1) from 0.05 to 5 weight percent of an oil-soluble barium overbased calcium sulfonate of the formula

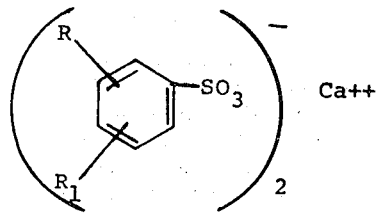

wherein
R is hydrogen or an alkyl having from 10 to 22 carbons, and
$R_1$ is an alkyl having from 3 to 10 carbons when R is alkyl and having from 8 to 22 carbons when R is hydrogen; and having a base ratio of at least 4 and (2) from 0.05 to 2.0 weight percent of 4,4'-methylene bis (2,6-di-tert-butylphenol).

6. The method defined in claim 5 wherein said base ratio is between 5.1 and 10.

* * * * *